United States Patent [19]
Lucia

[11] 3,827,516
[45] Aug. 6, 1974

[54] STEERING MECHANISM FOR SNOWMOBILE
[76] Inventor: George C. Lucia, P.O. Box 38, Suamico, Wis. 54173
[22] Filed: Jan. 29, 1971
[21] Appl. No.: 110,836

[52] U.S. Cl. .............................. 180/5 R, 280/21 A
[51] Int. Cl. ............................................ B62m 27/02
[58] Field of Search .................................. 180/3–6; 280/25, 21, 26, 16

[56] References Cited
UNITED STATES PATENTS
2,700,427  1/1955  Schomers............................... 180/3
3,664,446  5/1972  Burtis.................................. 180/5 R Primary Examiner—Richard J. Johnson
Attorney, Agent, or Firm—Hauke, Gifford, Patalidis & Dumont

[57] ABSTRACT

A steering mechanism for snowmobiles or similar ski borne vehicles which mechanism is actuated in response to movement of a selectively rotatable steering means such as a steering wheel to provide turning movement of the skis in the direction travel is desired and, at the same time, to provide tilting movement of the skis each about its own longitudinal axis. To achieve these combined results, a first pair of rods is connected between the steering means and a crank mechanism fixed to the skis for providing the turning movement. A second pair of rods is likewise connected between the steering means and the skis for providing respective tilt motion and a common actuator is connected to the steering means and both pair of rods for operating them.

8 Claims, 12 Drawing Figures

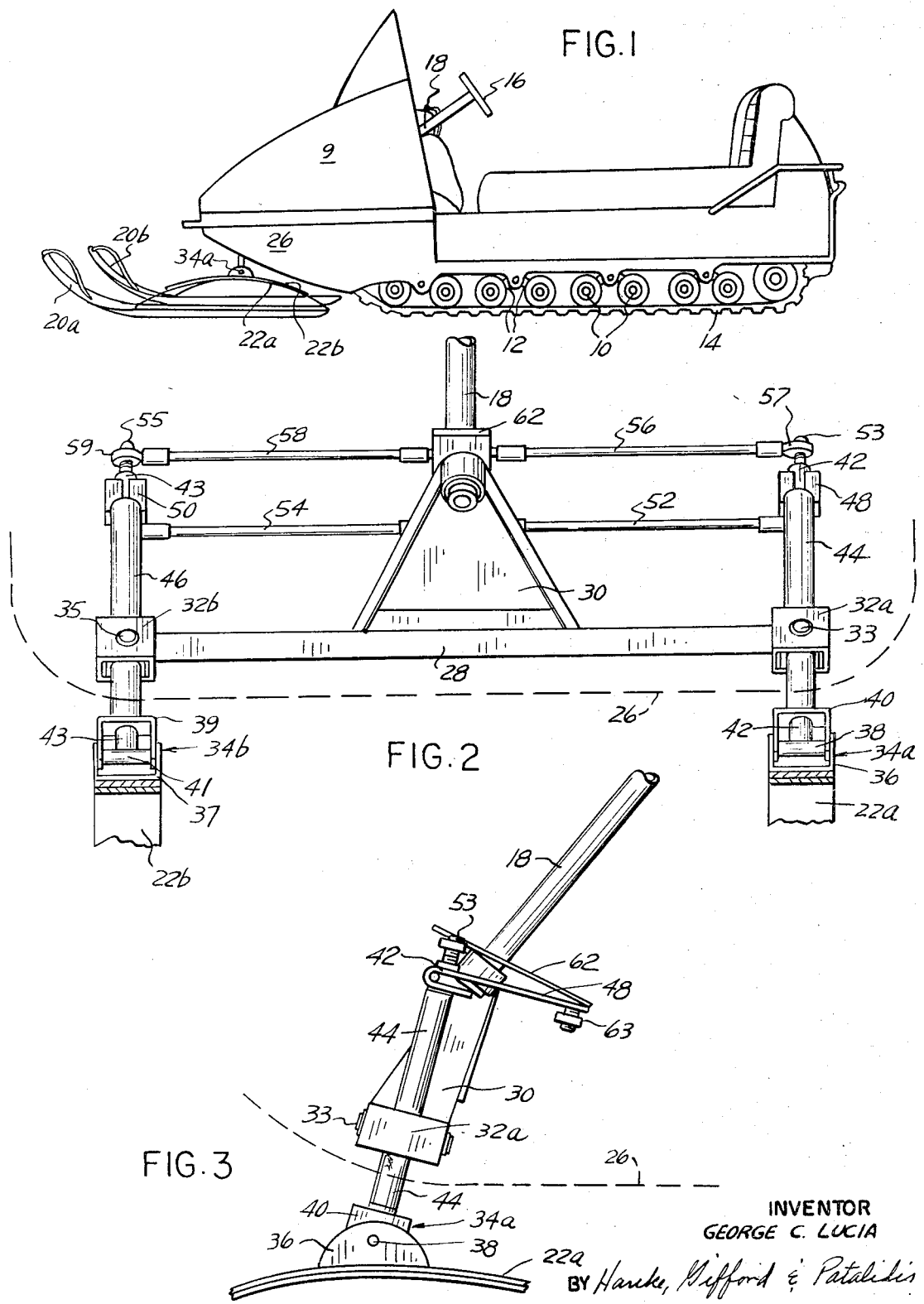

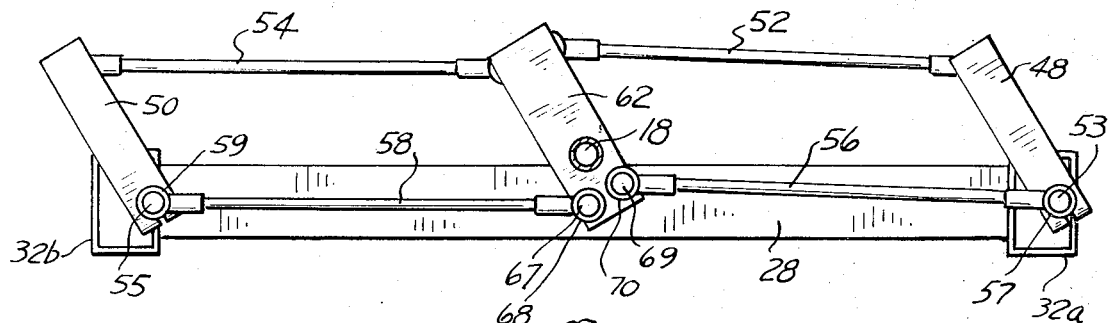
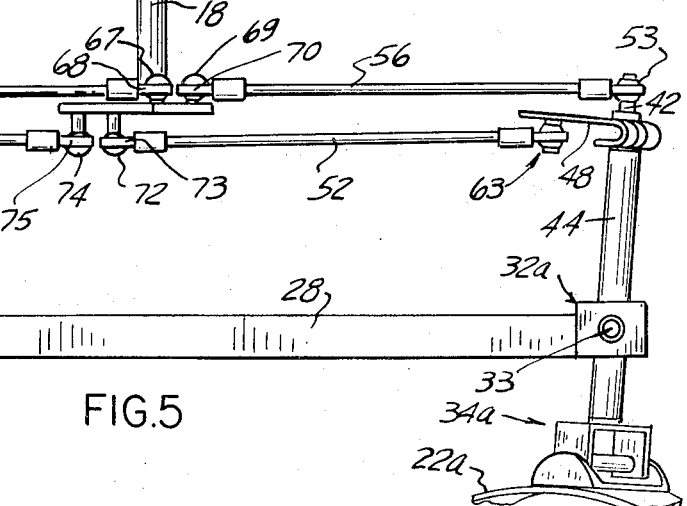
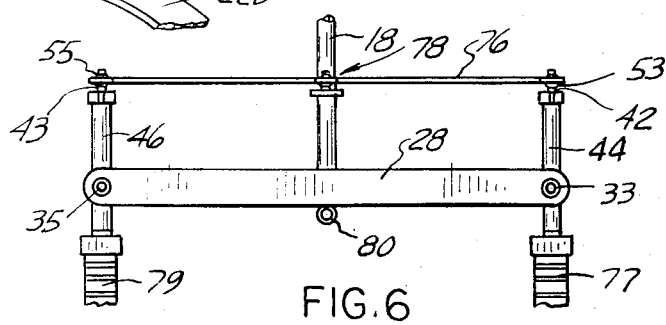
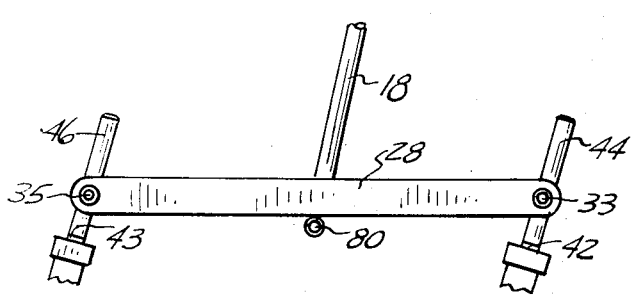
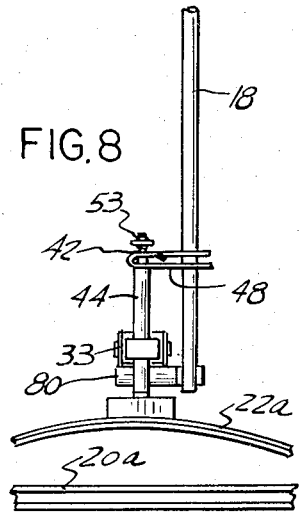

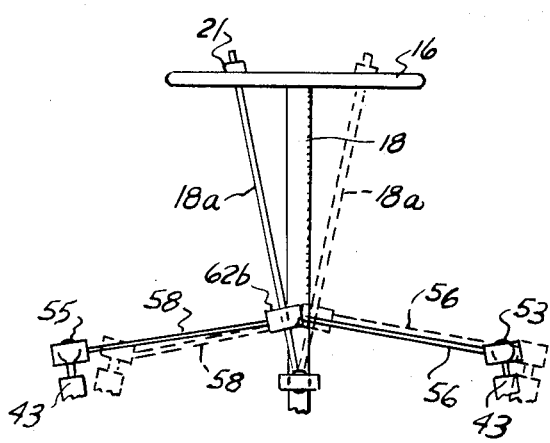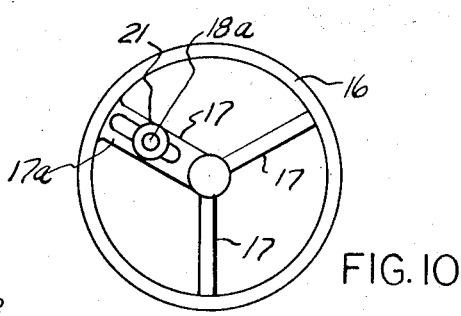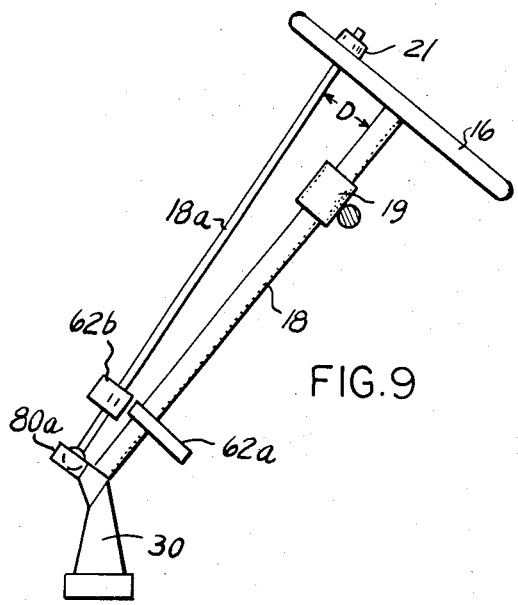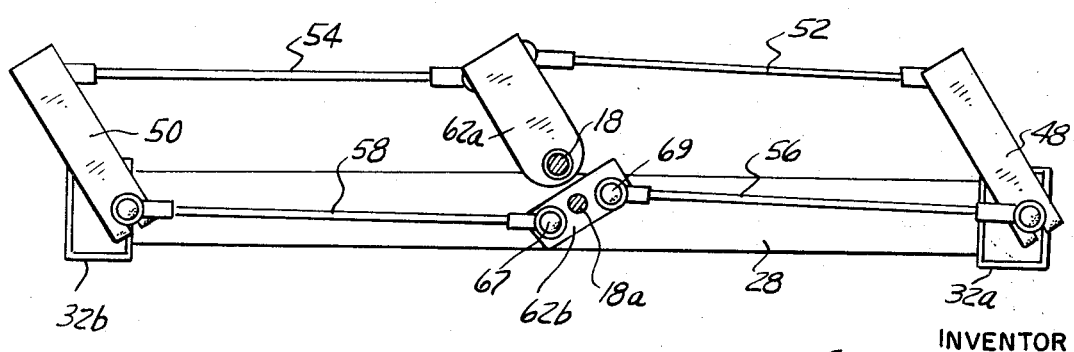

STEERING MECHANISM FOR SNOWMOBILE

BACKGROUND OF THE INVENTION

I. Field of the Invention

The present invention relates to an improved steering mechanism for snowmobiles and the like and, more particularly, to means for achieving at the same time a steering orientation of the skis in the direction desired and a proper tilting of the skis toward the outside of the circle in which the turn is being made.

II. Description of the Prior Art

Means have heretofore been devised to provide steering of snowmobiles and like vehicles by ski direction through various steering lever and steering wheel operated arrangements. Additionally means have been provided which are actuated following the steering control movements to provide some degree of tilt of the skis or a shift of the vehicle center of gravity during the turning operation. A problem exists particularly with regard to high powered ski vehicles which have accentuated side slippage and a tendency toward tipping during a turn. It is desirable to include in the steering mechanism provision for making the same ski tilt which a skilled skier would do by executing the well known "slalom." Previous attempts have been made to solve this problem by devising various steering and banking mechanisms which work independently one of the other. Other attempts have been made to achieve combined operation through mechanisms which, by the nature of their construction, limit to an undesirable degree either the extent of rotative movement which may be given to the skis or the degree of the available tilt.

The apparatus of the present invention is designed to permit a wide range of turn of the skis in either direction and, in accordance with the degree of steering achieved, to provide a correspondingly appropriate tilt of the skis. It is further significant that the apparatus of the present invention has a common operating means and a simple but reliable mode of actuation which requires no special skill on the part of the operator.

SUMMARY OF THE PRESENT INVENTION

The present invention provides an actuating mechanism for combined steering and tilt of skis for use in a powered ski vehicle. It may similarly be utilized in connection with a ski borne vehicle having no motive power but in which one or more pairs of steerable skis are employed. The mechanism includes a direct mechanical connection between the steering member which actuates through a crank means the rotation of the skis in the desired direction while at the same time tilting the skis with the same motion of the steering mechanism. This combined two-fold operation is achieved by the simultaneous rotation and tilt of those intermediate kingpins to which the skis are mounted. The kingpins are themselves pivotably connected to the ski vehicle frame and to achieve the desired ski banking or tilting the kingpins are themselves given the necessary inclination which serves to likewise tilt the skis.

DESCRIPTION OF THE DRAWINGS

A more complete understanding of the present invention will be apparent from the following description of several preferred embodiments. The description makes reference to the accompanying drawings in which the reference characters refer to like parts where they occur throughout the several views and in which:

FIG. 1 is a side elevational view of a snowmobile illustrating one type of ski borne vehicle suitable for the incorporation of the invention;

FIG. 2 is a front view of the steering mechanism with the front cover of the snowmobile removed and certain of the parts broken away;

FIG. 3 is a partial side elevational view of the steering mechanism as it is mounted in the vehicle;

FIG. 4 is a top plan view which illustrates the steering mechanism in its moved position to provide a left turn;

FIG. 5 is a front elevational view of the steering mechanism in the same left turn position illustrated beforehand in FIG. 4;

FIG. 6 is a front elevational view of an alternate embodiment of the present invention in which a separate motion of the steering means is employed to provide tilting of the skis;

FIG. 7 is a similar view illustrating the device of FIG. 6 in a moved position to provide ski tilt;

FIG. 8 is a side elevational view of the device of FIG. 6;

FIG. 9 is a diagrammatic side elevational view of a still further embodiment of the present invention;

FIG. 10 is a top plan view of the device of FIG. 9;

FIG. 11 is a diagrammatic view of a portion of the device of FIG. 9 illustrating its mode of operation; and FIG. 12 is a top elevational view of the embodiment of FIG. 9, partly in section.

DETAILED DESCRIPTION

Now, referring to the drawings for a more detailed description of the preferred and several alternate embodiments of my invention, FIG. 1 shows a snowmobile which is powered by a suitable drive mechanism including a drive motor 9 and a plurality of idler bogies 10 which carry an endless flexible track 14. The idler bogies 10 are mounted on pairs of spring biased pivoting levers 12 to provide the necessary shock absorption. The various controls and details of the drive mechanism are not pertinent with respect to the present invention and in the interest of brevity will therefore be omitted. The steering mechanism which is of primary interest with regard to the present invention includes a rotatable steering means, in the present instance, a steering wheel 16, although other similar devices such as those of the handlebar or steering lever type might be employed. The steering mechanism is itself contained in the forward portion of the vehicle and coupled to a steering shaft 18. The visible portion of the steering mechanism includes a pair of skis 20a and 20b which are connected through an appropriate resilient means such as leaf springs 22a, 22b to a corresponding pair of swivel mounting assemblies 34a and 34b of which the former is seen in FIG. 1.

FIG. 2 is a front view showing the major components of the steering mechanism and their relationship to the rotatable steering shaft 18. The mechanism is shown as it is located in the lower portion of the body 26 which encloses the frame of the snowmobile. The outline of the lower body 26 is shown in dash line configuration. The vehicle frame to which the steering mechanism is attached includes a cross bar 28 on which is connected an upstanding triangular brace 30. The upper end of the brace 30 provides a journal support for the lower end of the steering shaft 18. The cross bar 28 further has mounted at its ends a pair of pivotal mounting frames 32a and 32b, respectively. The structure of the mounting frames 32a, 32b will be further clarified in FIG. 3 hereinafter.

The skis 20a, 20b are connected through their associated leaf springs 22a, 22b to the pair of swivel mounting assemblies previously designated by the numerals 34a, 34b. The principal means for connecting the skis 20a, 20b to the vehicle frame includes a pair of upstanding kingpins 42, 43. The mounting 34a for the left hand ski 20a includes an outer swivel mounting plate 36 coupled to the leaf spring 22a, an inner swivel support 40 and a connecting pin 38. The swivel support 40 is fixed to the lower end of the kingpin 42. A swivel mounting is provided for the right hand ski 20b through the mounting assembly 34b which includes an outer swivel mounting plate 37 connected to the leaf spring 22b, an inner swivel support 39, and a connecting pin 41. Swivel support 39 is itself fixed to the lower end of the kingpin 43. The turning movement of the two skis 20a, 20b is thus provided through the rotation of the two substantially vertical kingpins 42, 43. The kingpins 42, 43 are appropriately journalled in a pair of upstanding sleeves 44, 46 respectively. The rotative movement of the kingpins 42, 43 is controlled through the operation of a pair of crank arms 48 and 50, each of which is clamped at its forward end to the upper end of a corresponding one of the kingpins 42, 43. The crank arms 48 and 50 are further connected at their rearward ends to one of the outer ends of a pair of operating rods 52, 54. The inner ends of the operating rods 52, 54 are both connected to a common operating means embodied as operating plate 62 which plate in turn is fixed near the lower end of the steering shaft 18. The end connections of rods 52 and 54 will be better shown in FIG. 5 hereinafter.

FIG. 2 also shows the mechanism for providing the desired degree of tilt or bank to the skis 20a and 20b about their respective longitudinal axes. The two kingpins 42 and 43 terminate at their upper ends in balls 53 and 55, respectively. A horizontal draw bar or rod 56 has connected at its outer end a socket 57 for retaining the ball 53 of kingpin 42 in a pivotal ball and socket connection. Similarly, with respect to the other kingpin 43, a second horizontal drawbar or rod 58 includes at its left end a socket 59 for retaining the ball 55 of the kingpin 43.

It will be seen that, responsive to the turning of steering shaft 18 and of operating plate 62 fixed thereon, the operating rods 56, 58 both will be moved either leftwardly or rightwardly to provide the appropriate tilting of the kingpins 42, 43 and their corresponding sleeves 44, 46 about the pivotal mountings provided by a pair of studs 33 and 35 respectively. The rotating movement of the steering shaft 18 and operating plate 62 likewise serves to move rearward rods 52 and 54 axially to turn cranks 48, 50 and their associated skis in the selected direction of turn.

FIG. 3 provides a side view of the steering mechanism in its mounted position relative to body 26. It will be seen that the left hand kingpin sleeve 44 and kingpin 42 are maintained in a position inclined only slightly in a rearward direction from the vertical. The two pairs of operating rods 52, 54 and 56, 58 have been omitted from FIG. 3 to best illustrate the relative positions of certain of the parts. A connecting ball 63 is shown mounted on the lower surface of the rearward end of the crank 48 and adapted for connection to a mating socket member carried at the end of the rod 52. Also shown is the manner in which the spring 22a and its connected ski 20a are pivotably movable about the connecting pin 38 during forward motion of the ski vehicle over irregular terrain.

FIG. 4 shows a further view of the steering mechanism of FIG. 2 in which a 30° left turn has been selected by the driver. The steering wheel 16 and its associated steering shaft 18 have been rotated to turn the operating plate 62 in a counterclockwise direction. This moves the connecting rods 52, 54 axially to turn the cranks 48 and 50 and to rotate accordingly the associated kingpins and skis in the same direction. At the same time, the forward end of the operating plate 62, that end located closer to steering shaft 18, is likewise displaced. This moves both the rods 56 and 58 axially and causes displacement of the upper ends of the two kingpins 42, 43 to provide ski tilt.

FIG. 5 likewise illustrates the steering mechanism displaced to a 30° left turn position with the mechanism viewed from the front. The pivotal movement of kingpins 42, 43 about studs 33, 35 is shown. FIG. 5 further illustrates the ball and socket connection of the two pairs of rods 56, 58 and 52, 54 at their respective inner ends which connection is made with the upper and lower portions of operating plate 62. For this purpose, a pair of balls 67, 69 are mounted at the upper surface of operating plate 62 near its forward edge. Suitable socket connectors 68, 70 are fixed to the inner ends of rods 58, 56 respectively to provide a pivotal ball and socket connection. A second pair of connecting balls 72, 74 are mounted at the lower surface of operating plate 62 near its rearward end. Corresponding mating socket connectors 73 and 75 are used to couple the inner ends of rods 52 and 54, respectively, in the manner shown. The required ball and socket connections between the rearward ends of crank 48, 50 and rods 52, 54 are designated generally by the numerals 63 and 65.

FIG. 6 illustrates an alternate embodiment of the invention in which there is independently provided a tilting and a turning operation of the skis. To enable this mode of operation, a rockable frame is mounted on the vehicle with the frame lying in plane transverse to the vehicle longitudinal axis. The frame comprises a cross rod 76 which is pivotably connected between the ball 53 at the upper end of the kingpin 42 and the ball 55 formed at the upper end of kingpin 43. The center of the cross rod 76 is further coupled at its central portion to the steering shaft 18 through a ball and socket connection denoted by the numeral 78. The lower end of steering shaft 18 is additionally pivotally mounted as by a pin and sleeve connection 80 to the frame cross bar 28. The side members of the rockable frame comprise the kingpins, 42, 43 and their respective pivotally mounted sleeves 44, 46. A pair of resilient mounting means for the skis 20a, 20b are provided by springs 77, 79.

FIG. 7 illustrates the operation of steering shaft 18 to provide ski tilt clockwise about the longitudinal axes of the skis. The kingpins 42, 43 and their associated sleeves have been rotated about studs 33, 35 responsive to the movement of shaft 18 rightwardly and responsive to the accompanying operation of cross rod 76.

FIG. 8 is a side view of the apparatus of FIG. 6 indicating the relative locations of the ski 20a and the steering mechanism. The turning of the ski 20a through rotation of the kingpin 42 is accomplished with crank 48 coupled to the kingpin 42 in the manner shown. In this respect, the steering mechanism for the two embodiments of this invention are the same. Steering shaft 18 is accordingly mounted to permit its pivotal movement about pin 80 for ski tilt and to further permit its selective rotation about its own longitudinal axis for ski turning.

FIG. 9 shows a still further embodiment of the present invention which bears some similarity to each of the two foregoing described embodiments of FIGS. 2 and 6. In the FIG. 2 and 6 embodiments, the steering and tilt control are exercised through the operation of the steering shaft or column 18 itself, either through its rotative movement or through its concurrent rotative and pivotable movement. In the embodiment of FIG. 9, the steering and tilt control for the skis 20a and 20b is maintained through a tilt actuating column 18a, which column is formed separately from the steering column 18. The tilt actuating column 18a is supported and pivotably mounted in a lower support 80a, which support provides a ball and socket bearing for the lower end of the column 18a. The tilt actuating column 18a is fixed at its upper end to the steering wheel 16 in a manner which will be shown more clearly in FIG. 10 hereinafter. The steering control in the FIG. 2 embodiment is controlled through the rotation of the steering column 18 and through the movement of the attached operating plate 62. In the FIG. 9 embodiment, the operating plate 62 is separated into plates 62a and 62b, such plates being attached to the steering column 18 and to the tilt actuating column 18a, respectively. The detail of the connection of the several operating rod pairs 52, 54 and 56, 58 to provide the respective steering and tilt movement of the kingpins 42, 43 will be shown more completely in FIGS. 11 and 12 hereinafter. It will be seen that the tilting movement of the column 18a and, accordingly, the tilt of the associated skis 20a and 20b are a function of the distance D, which distance is measured between the upper ends of the columns 18a and 18. A suitable locking device 21 may be connected to the upper end of the tilt actuating column 18a to hold it in a preselected radial position corresponding to the preselected distance D.

FIG. 10 shows the manner in which the upper end of the tilt actuating column 18a is held in spaced relationship from steering shaft 18 by means of its connection to steering wheel 16. The steering wheel 16 contains a plurality of spokes 17, one of which includes a longitudinal radial slot 17a for holding the upper end of the tilt actuating column 18a. The locking device 21 is shown at the upper end of the tilt actuating column 18a. The direction of adjustment indicated by arrows indicates the setting of the distance D of FIG. 9. Since the amount of tilt is determined by the distance D setting, the operator may preset the amount or degree of tilt desired by prepositioning the column 18a in the slot 17a and then locking it during operation of the ski vehicle. The greater the distance D, the greater will be the amount of tilt provided to the skis.

FIG. 11 shows the tilt actuating column 18a and its spatial relationship to the steering column 18. The left hand solid line position of the tilt actuating column 18a illustrates its position for a right turn of the skis 20a, 20b. The right hand dash line showing indicates the moved position of the tilt actuating column 18a for a left turn of the skis 20a, 20b. The associated rods 56, 58 and kingpins 42, 43 operate in the same manner explained hereinafter to provide the required tilting movement.

FIG. 12 is a view substantially similar to that of FIG. 4 but illustrating the separation of the tilt control and turning control into the two different control members. Tilt control is provided through the operation of the tilt actuating column 18a in which turning control is exercised through the operation of the steering column 18. The separation of the two functions is accomplished by dividing the plate 62 into a rearward plate 62a and a forward plate 62b. The rearward plate 62a is rigidly fixed near the lower end of the steering column 18 for turning control. The forward plate 62b is fixed near the lower end of the tilt actuating column 18a for tilt control operation. The several connecting rod pairs 52, 54 and 56, 58 control the respective turning and tilting of the kingpins 42, 43 and hence of the attached skis 20a, 20b.

It will thus be seen that the invention illustrated by the several embodiments described above may be embodied in other specific forms without departing from the spirit or essential characteristics thereof.

I claim:

1. In a ski vehicle comprising a body frame and a pair of aligned parallel skis operatively connected to said frame for supporting said frame and steering said vehicle in a selected direction, a mechanism for combined steering and tilt control of said skis comprising a pair of substantially parallel kingpins, said kingpins being mounted on said frame each swivelable about an axis substantially vertical and pivotably laterally tiltable about an axis substantially horizontal, a rotatable steering shaft mounted on said frame and operatively connected to each of said kingpins for swiveling in unison each of said kingpins and its associated ski in said selected direction for steering of said vehicle, and means connected between said rotatable steering shaft and each of said kingpins for pivoting both said kingpins and their associated skis in unison and in the same direction for substantially equal lateral tilt about said substantially horizontal axis, said last mentioned means comprising a pair of rods each operatively coupled between said steering shaft and a different one of said kingpins for conjointly imparting said pivotal movement to said kingpins, whereby said kingpins are caused to remain constantly parallel and said skis are maintained at a substantially constant distance from said horizontal axis.

2. The combination as set forth in claim 1 wherein each of said kingpins is supported in a journal sleeve mounted on said frame substantially on a vertical axis and wherein each of said journal sleeves is affixed to said frame pivotable about said substantially horizontal axis.

3. The combination as set forth in claim 1 wherein said steering shaft comprises a crank means and wherein said steering shaft is connected to each of said kingpins through said crank means for swiveling each of said kingpins and thereby turning its associated ski.

4. The combination as set forth in claim 1 wherein said steering shaft includes a pair of cranks each fixed to the upper end of one of said kingpins and a second pair of rods each connected between one of said crank ends and the lower end of said shaft for providing swiveling to said kingpins and said skis.

5. The combination as set forth in claim 4 wherein said first and second pairs of rods are connected to opposite ends of an operating plate for actuation, said plate being affixed to said shaft proximate its lower end.

6. In a ski vehicle comprising a body frame and a pair of aligned parallel skis operatively connected to said frame for supporting it and steering said vehicle in a selected direction, a mechanism for steering and tilt control of said skis comprising a pair of substantially parallel kingpins, said kingpins being mounted on said frame each swivelable about an axis substantially vertical and pivotably laterally tiltable about an axis substantially horizontal, steering control means mounted on said frame and operatively connected to each of said kingpins for swiveling in unison each of said kingpins and its associated ski in said selected direction for steering of said vehicle, tilting means connected between said steering control means and each of said kingpins for pivoting both said kingpins and their associated skis in unison and in the same direction for substantially equal lateral tilt about said substantially horizontal axis, wherein said control means comprises a pair of cranks each affixed to the upper end of one of said kingpins and a first pair of rods each connected between an end of one of said cranks and the lower end of said steering shaft for providing swiveling of said kingpins and said skis for steering, and a second pair of rods each connected between said tilting means and an end of a kingpin for providing said pivotal movement of said kingpin for tilting of said kingpins and associated skis.

7. The combination as set forth in claim 6 wherein said tilting means comprises said steering shaft mounted at its lower end on said body frame for rotational motion for operating said first pair of rods for steering and for lateral pivotal motion for operating said second pair of rods for tilting of said kingpins, whereby the amount of said steering and the amount of said tilting are independently provided respectively by said rotational motion and said pivotal motion of said steering shaft.

8. The combination as set forth in claim 6 wherein said steering shaft is mounted at its lower end on said body frame for rotational motion for operating said first pair of rods for steering, said tilting means comprises a column mounted for universal pivotal movement at its lower end on said body frame proximate said steering shaft, said second pair of rods connected to said column, a radially extending bracket fixedly mounted on said steering shaft, a radial slot in said bracket for accepting therethrough said column proximate the upper end thereof, and means for adjustably clamping said column in said slot at various radial distances from the axis of rotation of said steering shaft for providing various amounts of tilt of said kingpins for a given rotational motion of said steering shaft.

* * * * *

UNITED STATES PATENT OFFICE
CERTIFICATE OF CORRECTION

Patent No. 3,827,516         Dated August 6, 1974

Inventor(s) GEORGE C. LUCIA

It is certified that error appears in the above-identified patent and that said Letters Patent are hereby corrected as shown below:

IN THE DRAWINGS:

FIG. 11, change kingpin "43" (right side) to --42--.

Signed and sealed this 17th day of December 1974.

(SEAL)
Attest:

McCOY M. GIBSON JR.
Attesting Officer

C. MARSHALL DANN
Commissioner of Patents